United States Patent [19]
Graef

[11] Patent Number: 5,898,705
[45] Date of Patent: Apr. 27, 1999

[54] METHOD FOR DETECTING BUS SHORTS IN SEMICONDUCTOR DEVICES

[75] Inventor: Stefan Graef, Milpitas, Calif.

[73] Assignee: LSI Logic Corporation, Milpitas, Calif.

[21] Appl. No.: 08/771,004

[22] Filed: Dec. 23, 1996

[51] Int. Cl.[6] .................................................. G01R 31/28
[52] U.S. Cl. .......................................... 371/27.1; 364/489
[58] Field of Search ................................ 371/27.1, 22.3, 371/25.1, 27.4, 28; 364/489, 490, 550, 578, 491, 488; 324/500, 512, 765, 528, 763; 395/181, 183.01, 183.13, 183.03, 182.06

[56] References Cited

U.S. PATENT DOCUMENTS

| | | | |
|---|---|---|---|
| 5,390,193 | 2/1995 | Millman et al. | 371/27 |
| 5,475,695 | 12/1995 | Caywood et al. | 371/27 |
| 5,513,188 | 4/1996 | Parker et al. | 371/22.3 |
| 5,517,506 | 5/1996 | Underwood et al. | 371/27 |
| 5,530,372 | 6/1996 | Lee et al. | 324/758 |
| 5,535,223 | 7/1996 | Horstmann et al. | 371/27 |
| 5,668,745 | 9/1997 | Day | 364/580 |
| 5,671,150 | 9/1997 | Maxwell | 364/488 |
| 5,672,966 | 9/1997 | Palezewski et al. | 324/158.1 |
| 5,706,294 | 1/1998 | Takahashi et al. | 371/22.1 |

*Primary Examiner*—Robert W. Beausoliel, Jr.
*Assistant Examiner*—Nadeem Iqbal

[57] ABSTRACT

A method is provided for generating test vectors to detect bridge faults in a semiconductor device. In one version of the invention, the method includes the steps of creating a net name data structure from a structural description of the semiconductor device which includes data representing the instance names for the nets to be tested, identifying a pair of nets in the net name data structure, and generating at least one test vector for the pair of nets such that, when the vectors impress on the nets, the state of the nets of the pair will change relative to each other such that logic, coupled to the pair, produces a signal which indicates whether a bridge fault exists between the nets of the pair.

15 Claims, 2 Drawing Sheets

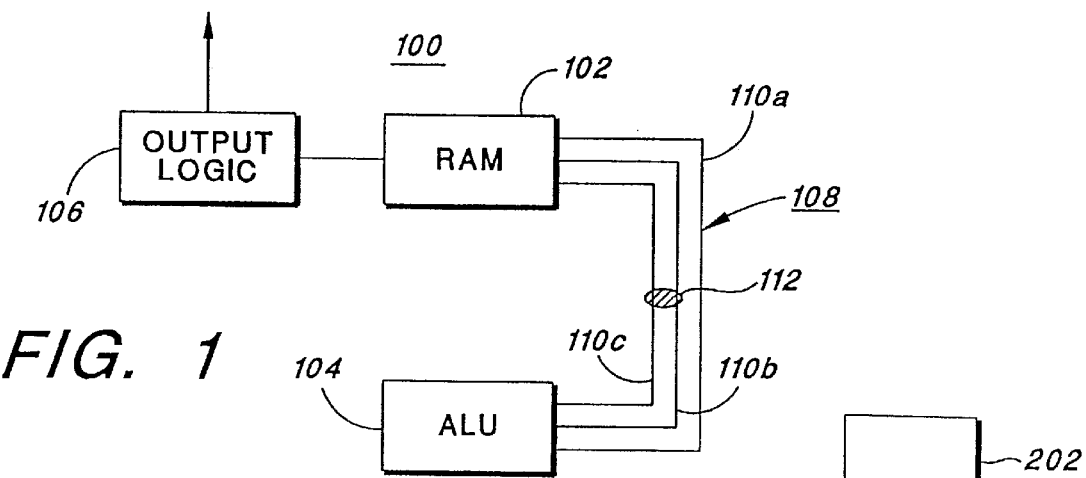
FIG. 1
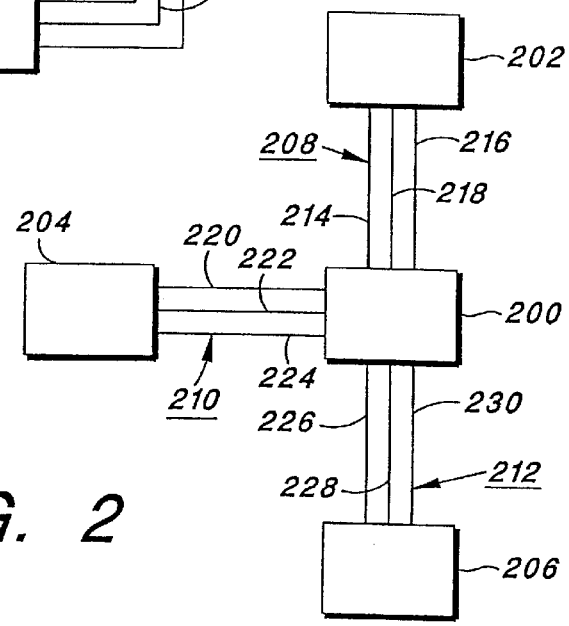
FIG. 2
| BUS NAME | NET NAME |
|---|---|
| BUS 208 | NET 214 |
| BUS 208 | NET 216 |
| BUS 208 | NET 218 |
| BUS 210 | NET 220 |
| BUS 210 | NET 222 |
| BUS 210 | NET 224 |
| BUS 212 | NET 226 |
| BUS 212 | NET 228 |
| BUS 212 | NET 230 |
FIG. 3
FIG. 4
| BUS A | NET-NAME A | BUS B | NET-NAME B |
|---|---|---|---|
| BUS 208 | NET 214 | BUS 208 | NET 216 |
| BUS 208 | NET 216 | BUS 208 | NET 218 |

METHOD FOR DETECTING BUS SHORTS IN SEMICONDUCTOR DEVICES

TECHNICAL FIELD

This invention relates generally to methods for testing semiconductor devices, and more particularly, to methods for checking for wire shorts between two adjacent wires on a semiconductor device.

BACKGROUND OF THE INVENTION

Semiconductor devices, such as application specific integrated circuits ("ASIC's"), are thoroughly tested to ensure proper performance before being shipped to a customer. Automatic test pattern generating ("ATPG") tools are used to generate test patterns, or vectors, necessary to test the devices. Generally, a semiconductor device is designed with either a schematic design tool, which allows transistor level design, or a synthesis tool which allows a circuit to be designed from various modules which are linked into and accessible by the tool. In either case, the resulting design data is then supplied to an ATPG tool. The ATPG tool also receives input from a script file which contains various commands, such as conditioning for inputs, which inform the tool of the various conditions and states for which the device is to be tested.

From these inputs, the ATPG tool then generates the test vectors which will be used by automatic test equipment ("ATE") to test the device. Suitable ATE is well known in the art and examples include wafer probing equipment such as the ST212 manufactured by Creedence Systems, Inc. The ATE then tests the device by supplying the test vectors generated by the ATPG tool to the inputs of the device and recording the outputs of the device in response. The outputs generated by the device should match the outputs predicted by logic simulation of the design. If not, then the device may be considered defective and disposed of.

Generally, the vectors are chosen to test the transistors in the device in both the on and off state. While complete coverage of all the transistors in the device is not always obtainable, it is still desirable to test at least a high percentage of them. However, there are other types of defects which can occur in the device which are not necessarily detectable by vectors which are designed for checking transistor states. For example, short circuits can occur between two wires which are adjacent on the chip. This type of defect is referred to as a "bridge fault" and may escape undetected by present automatic test pattern generators because ATPG tools are typically not provided with information about the physical location of the wires on the device and, consequently, are unable to generate appropriate test vectors. It is therefore, one object of the present invention to provide a method for testing for bridge faults in semiconductor devices. Further objects and advantages will become apparent in view of the following disclosure.

SUMMARY OF THE INVENTION

One aspect of the invention relates to a method for generating test vectors to test bridge faults in a semiconductor device. In one embodiment, the method comprises creating a net name data structure from a structural description of the semiconductor device which includes data representing the instance names for the nets to be tested; identifying a pair of nets in the net name data structure; generating at least one test vector for the pair of nets such that, when the vector is impressed in the nets, the state of the nets of the pair will change relative to each other such that logic, coupled to the pair, produces a signal which indicates whether a bridge fault exists between the nets of the pair.

A further aspect of the invention relates to a method for testing a semiconductor device for a bridge fault. In one embodiment, the method comprises creating a net name data structure from a structural description of the semiconductor device which includes data representing the instance names for the nets to be tested; identifying a pair of nets in the net name data structure; generating at least one test vector for the pair of nets such that, when the vector is impressed on the nets, the state of the nets of the pair will change relative to each other such that logic, coupled to the pair, produces a signal which indicates whether a bridge fault exists between the nets of the pair; and executing the at least one test vector with the semiconductor device and monitoring the signal produced by the logic and response.

Still a further aspect of the invention relates to a computer readable medium having a data structure stored thereon, the data structure representing test vectors to detect bridge faults in a semiconductor device. In one embodiment, the data structure is generated by the steps of creating a net name data structure from a structural description of the semiconductor device which includes data representing the instance names for the nets to be tested; identifying a pair of nets in the net name data structure; and generating at least one test vector for the pair of nets such that, when the vector is impressed on the nets, the state of the nets of the pair will change relative to each other such that logic, coupled to the pair, produces a signal which indicates whether a bridge fault exists between the nets of the pair.

BRIEF DESCRIPTION OF THE DRAWINGS

FIG. 1 is a block diagram of a circuit for illustrating an embodiment of the invention.

FIG. 2 is a block diagram of a circuit for illustrating an embodiment of the invention.

FIG. 3 is a net name data structure according to one embodiment of the invention.

FIG. 4 is a net name data structure according to a further embodiment of the invention.

DETAILED DESCRIPTION OF EMBODIMENTS OF THE INVENTION

Figures 5, 6A, 6B, 6C:
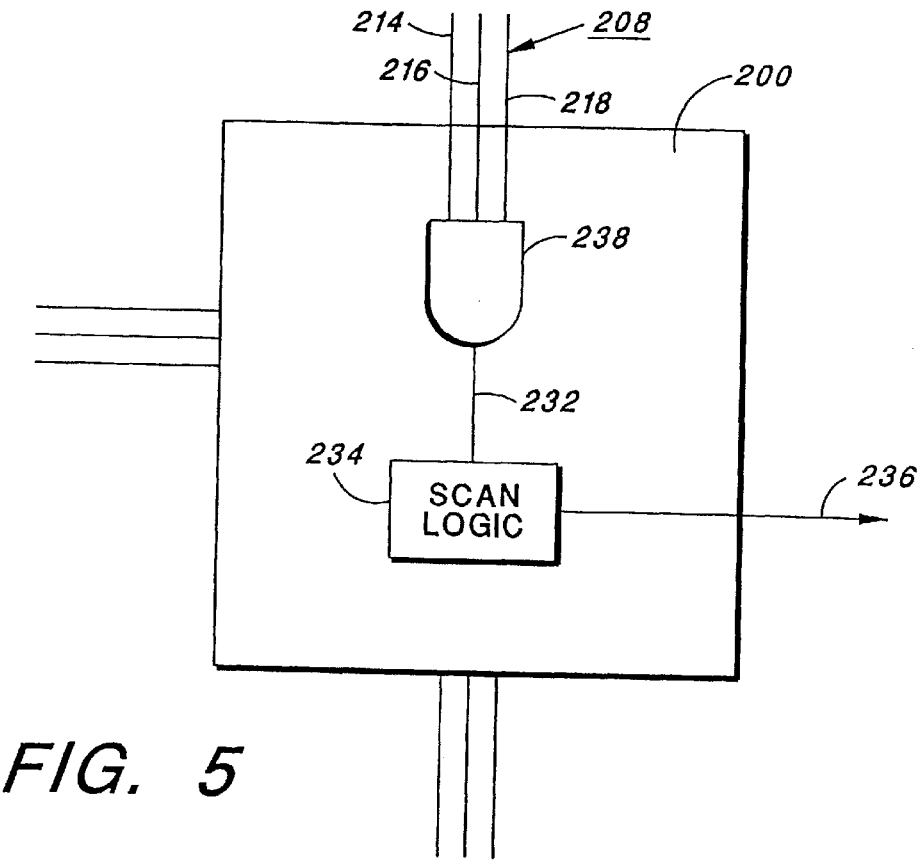
FIG. 5 is a block diagram of a circuit for illustrating another embodiment of the invention.
FIGS. 6A–6C are truth tables for vectors generated according to embodiments of the invention.

FIG. 1 is a schematic diagram illustrating an embodiment of the invention. In this case, the circuit 100 comprises two logic blocks 102 and 104 coupled together by bus 108. In the particular example shown, logic block 102 comprises RAM memory, and logic block 104 is shown as an arithmetical logic unit ("ALU"), although it will be understood that this is for illustration only, and the nature of the logic is immaterial to the invention. Bus 108 which connects ALU 104 to RAM 102 comprises three individual nets 110a, 110b, and 110c. Each net connects one port from the ALU 104 to one port on RAM 102. In this case, the diagram shown in FIG. 1 indicates the physical layout of the nets on the semiconductor device, i.e., net 110a is adjacent to net 110b and net 110b is adjacent to net 110c. Each net is physically formed by a metal line, or wire, disposed on a layer of the semiconductor device. If a defect occurs during manufacturing, it is possible that two of the lines, such as 110b and 110c, may be electrically coupled together by a bridging defect 112.

To allow proper testing by the ATE, RAM 102 is provided with output logic 106 which allows various signals generated within the RAM logic 102 to be passed out to bond pads on the integrated circuit, through, for example, a scan chain.

To enable the ATPG to generate test vectors to check for shorts between adjacent lines, or nets, it is necessary to provide information to the ATPG concerning the physical location of the nets, or the identity of specific nets to be checked. This will be illustrated in greater detail with respect to the block diagram shown in FIG. 2. FIG. 2 is a block diagram representing the layout of four logic blocks on an exemplary semiconductor device. Logic block 200 is coupled to logic blocks 202, 204 and 206 by busses 208, 210 and 212, respectively. Each bus comprises three nets, 214–218, 220–224 and 226–230 as shown. The structural description of the circuit shown in FIG. 2, which contains the interconnectivity activity of the logic blocks, typically includes a "net-list" file which is generated by a design tool such as DESIGN COMPILER, manufactured by Synopsis, Inc. The specific format and content of the net-list is tool dependent. Thus, the exact manner in which the interconnectivity of the logic modules is represented will depend on the particular software which generates in the net-list, as well as the manner in which it was configured by the circuit designer. Typically, each item in the net-list is given an individual name, commonly referred to as an "instance" name. For purposes of illustration, it will be assumed that the instance name for each net in the net-list includes the bus name and corresponds to the reference number shown in the figure. Other formats will, of course, exist; it is well within the capabilities of one skilled in the art to adapt the invention to specific data formats.

With this in mind, FIG. 3 shows a data structure according to an embodiment of the invention. In this case, the data structure comprises a plurality of entries 300–316. Each entry comprises two fields, a bus name field and a net name field. For each bus and net shown in FIG. 2, the corresponding instance name is provided in an entry in the net name structure.

The net name structure shown in FIG. 3 is referred to as an "ordered" structure because the arrangement of the data within the structure is related to the physical layout of the nets within each bus. For example, entry 300 for net 214 is written into the data structure immediately prior to entry 302 for net 216. Referring to FIG. 2, it is seen that net 214 is adjacent to net 216. Similarly, entry 302 occurs just prior to entry 304 for net 218 which is adjacent to net 216. Thus, the order of the structure provides information to the ATPG concerning the physical location of the nets. This allows the ATPG to generate test vectors for adjacent nets by reference to adjacent entries in the net name data structure. Generation of test vectors will be described in greater detail herein.

While the net-list contains data representing the interconnections of the modules on the chip and the net names for the connecting nets, it typically does not contain the layout data necessary to generate the table shown in FIG. 3. This concern may be addressed in different ways. In one embodiment, after the nets have been routed, either manually or automatically, this information is contained in a layout database. A variety of layout database formats are known to those of skill in the art. For example, the common GDS-2 format. The layout information from the layout database may then be mapped back to the structural data for the device. This process is commonly referred to as "back annotation". Techniques for back annotation are well known in the art and the specific steps required will vary according to the design and layout tools used.

According to another embodiment of the invention, the net name data structure specifically identifies the nets to be tested for bridge faults, rather than relying upon the order of the data in the structure. FIG. 4 shows an example of an unordered data structure. In this case, the data structure is provided with a plurality of entries 400, 402. Each entry comprises four fields, i.e., bus A, net name A, bus B, and net name B, which identify two nets to be checked for bridge faults. For example, in entry 400, the ATPG will generate vectors to test net 214 against net 216 for bridge faults. Similarly, in entry 402, vectors will be generated to test net 216 against net 218. The table shown in FIG. 4 may be generated without respect to the actual physical layout of the nets. This enables the designer to select nets in which there is a concern of bridge faults, even before the nets have been routed.

In still a further embodiment, the ATPG tool is instructed to generate vectors for all possible combinations of net pairs in the net name structure. This also avoids the necessity of back annotating data from the layout database. This also allows for ease of generating the net name structure because no particular order to the structure is required. The net names may be simply extracted from the design database. Methods for extracting the required data will depend on the specific tools used by the designer. For example, using the DESIGN COMPILER synthesis tool discussed previously, the following command lines will generate a suitable net name structure:

read../db/design1.db
current_design design1
bus_nets=find(port,all_connected(bus_a))
list bus_net>output_file Where a design file, i.e., design1.db, is designated as the current design and all nets connected to the port are selected and written into a data file called output_file.

Once the net name structure is generated, it is passed to the ATPG tool which generates test vectors to identify bridge faults. Techniques by which the ATPG processes the net name structure to produce suitable vectors are familiar to those skilled in the art. For example, one technique employed in automatic test pattern generation involves "stuck-at" fault analysis. See Weste, et al., "Principles of CMOS VLSI Design," 2d Ed. Addison-Wesley, pp. 472–473. To illustrate, FIG. 5 is a block diagram of a circuit similar to that shown in FIG. 2. In this case, bus 208 is coupled to AND gate 238 and logic block 200. The output of AND gate 238 as provided to scan logic 234 over wire 232. Scan logic 234 allows the output signal from AND gate 238 to be passed to an output pad on the semiconductor device where it can be monitored by the automatic test equipment. The ATPG tool, being provided with a net name data structure in accordance with an embodiment of the invention, will now generate test vectors to determine whether a bridge fault occurs between one of the nets 214–218 of bus 208.

Of course, the test vectors required will depend on the nature of the logic driven by signals on bus 208. In this case, the logic is a simple three input AND gate 238. However, the AND gate 238 is for purposes of illustration, and it will be clear to those of skill in the art that much more complex logic is readily adaptable to the present invention. The truth table for the logic, as well as the relevant timing, size and process parameters is provided to the ATPG tool through various libraries and other databases commonly used in conjunction with conventional ATPG tools.

In one embodiment, test vectors are generated by simply conditioning the logic which receives signals from the bus to a predetermined state, then holding one net to a given state while changing the state of an adjacent net. If the output logic changes states, then it can be assumed there is no bridge fault. This will be described in greater detail with respect to the circuit shown in FIG. 5 and the truth tables shown in FIGS. 6A–6C.

FIG. 6A is a truth table illustrating two vectors to check for a bridge fault between adjacent nets 214 and 216. Vector 1A is provided to AND gate 238 as shown. Assuming AND gate 238 is functioning properly, the output signal on line 232 is high as shown in the table. Next, holding net 216 high, net 214 is toggled low with vector 2A. This should cause the signal in line 232 to pull low. If this is the case, then vectors 1B and 2B are provided as shown in FIG. 6B. Again, vector 1B conditions the output on line 232 high. Next, line 216 is pulled low which, in turn pulls line 232 low. If a bridge fault exists between lines 216 and 218, then pulling line 216 low may not cause line 232 to go low, as shown in table 6C. This condition will be detected by the stuck-at-detection mechanism of the ATPG tool when the output of AND gate 238 is scanned out on line 236. The automatic test equipment will then provide an indication that a failure has occurred.

It will be apparent to those of skill in the art, that the invention may be readily adapted to other, more complex circuits involving numerous gates. Moreover, other variations in form and detail are also within the capabilities to one skilled in the art, without departing from the scope and spirit of the present invention. All patents, patent applications, and other publications referenced herein are hereby incorporated by reference as though set forth in full.

What is claimed is:

1. A method for generating test vectors to device, the bridge faults in a semiconductor device, the method comprising:

creating a net name data structure from a structural description of the semiconductor device which includes data representing the instance names for the nets to be tested;

identifying a pair of nets in the net name data structure;

generating a sequence of test vectors for the pair of nets such that, when a first test vector of the sequence of test vectors is impressed on the pair of nets, a first state of the nets is obtained, and when a second test vector of the sequence of test vectors is impressed on the pair of nets in the absence of a bridge fault, a second state of the nets is obtained that is changed from the first state; and when the second test vector is impressed on the pair of nets in the presence of a bridge fault, the first state of the nets remains unchanged, whereby the state of the nets after application of the second test vector indicates whether a bridge fault exists between the nets of the pair.

2. A method as in claim 1 wherein creating a net name data structure comprises ordering the instances names of the nets in the structure such that there is a relationship between the physical location of the nets on the semiconductor device and the order of the names in the structure.

3. A method as in claim 2 wherein identifying a pair of nets comprises selecting a pair of physically adjacent nets by reference to the order of their location in the net name structure.

4. A method as in claim 1 wherein identifying a pair of nets comprises determining combinations of net name pairs in the net name structure.

5. A method as in claim 1 wherein creating a net name data structure comprises extracting net location data from a layout data structure, the layout data structure containing data representing the relative physical location of the nets.

6. A method for testing a semiconductor device for a bridge fault, the method comprising:

creating a net name data structure from a structural description of the semiconductor device which includes data representing the instance names for the nets to be tested;

identifying a pair of nets in the net name data structure;

generating a sequence of test vectors for the pair of nets such that, when a first test vector of the sequence of test vectors is impressed on the pair of nets, a first state of the nets is obtained, and when a second test vector of the sequence of test vectors is impressed on the pair of nets in the absence of a bridge fault, a second state of the nets is obtained that is changed from the first state; and when the second test vector is impressed on the pair of nets in the presence of a bridge fault, the first state of the nets remains unchanged, whereby the state of the nets after application of the second test vector indicates whether a bridge fault exists between the nets of the pair; and executing the sequence of test vectors with the semiconductor device and monitoring the state of the nets in response.

7. A method as in claim 6 wherein creating a net name data structure comprises ordering the instances names of the nets in the structure such that there is a relationship between the physical location of the nets on the semiconductor device and the order of the names in the structure.

8. A method as in claim 7 wherein identifying a pair of nets comprises selecting a pair of physically adjacent nets by reference to the order of their location in the net name structure.

9. A method as in claim 6 wherein identifying a pair of nets comprises determining combinations of net name pairs in the net name structure.

10. A method as in claim 6 wherein creating a net name data structure comprises extracting net location data from a layout data structure, the layout data structure containing data representing the relative physical location of the net.

11. A computer readable medium having a data structure stored thereon, the data structure representing a sequence of test vectors to detect bridge faults in a semiconductor device, the data structure being generated by the steps of:

creating a net name data structure from a structural description of the semiconductor device which includes data representing the instance names for the nets to be tested;

identifying a pair of nets in the net name data structure; and generating a sequence of test vectors for the pair of nets such that, when a first test vector of the sequence of test vectors is impressed on the pair of nets, a first state of the nets is obtained, and when a second test vector of the sequence of test vectors is impressed on the pair of nets in the absence of a bridge fault, a second state of the nets is obtained that is changed from the first state; and when the second test vector is impressed on the pair of nets in the presence of a bridge fault, the first state of the nets remains unchanged, whereby the state of the nets after application of the second test vector indicates whether a bridge fault exists between the nets of the pair.

12. A computer readable medium as in claim 11 wherein creating a net name data structure comprises ordering the instances names of the nets in the structure such that there is a relationship between the physical location of the nets on the semiconductor device and the order of the names in the structure.

13. A computer readable medium as in claim 12 wherein identifying a pair of nets comprises selecting a pair of physically adjacent nets by reference to the order of their location in the net name structure.

14. A computer readable medium as in claim 11 wherein identifying a pair of nets comprises determining combinations of net name pairs in the net name structure.

15. A computer readable medium as in claim 11 wherein creating a net name data structure comprises extracting net location data from a layout data structure, the layout data structure containing data representing the relative physical location of the nets.

* * * * *